United States Patent [19]

Yoshimichi

[11] Patent Number: 5,745,606

[45] Date of Patent: Apr. 28, 1998

[54] METHOD AND SYSTEM FOR STORING INFORMATION IN COMPRESSED BLOCK DATA

[76] Inventor: Kanda Yoshimichi, 20 Suenaga, Takatsuku, Kawasaki-shi, Kanagawa-ken, Japan

[21] Appl. No.: 540,709

[22] Filed: Oct. 11, 1995

[51] Int. Cl.[6] .............................. G06K 9/36; H04N 1/40
[52] U.S. Cl. ........................ 382/237; 382/243; 358/455
[58] Field of Search ................................ 382/237, 243, 382/267, 169, 166, 238, 239; 341/87; 345/155, 203, 202; 370/335, 250; 380/21, 43; 358/429, 431, 455, 458, 462, 426, 430, 433; 395/307

[56] References Cited

U.S. PATENT DOCUMENTS

| 4,766,538 | 8/1988 | Miyoshi | 395/307 |
|---|---|---|---|
| 5,166,987 | 11/1992 | Kageyama | 382/239 |
| 5,202,771 | 4/1993 | Murayama | 358/426 |
| 5,247,357 | 9/1993 | Israelsen | 358/133 |

FOREIGN PATENT DOCUMENTS

| 58-182372 | 10/1983 | Japan | H04N 1/40 |
|---|---|---|---|
| 62-287775 | 12/1987 | Japan | H04N 1/40 |
| 62-293887 | 12/1987 | Japan | H04N 1/40 |
| 62-293888 | 12/1987 | Japan | H04N 1/40 |
| 63-87076 | 4/1988 | Japan | H04N 1/393 |
| 63-87077 | 4/1988 | Japan | H04N 1/393 |
| 2-46068 | 2/1990 | Japan | H04N 1/413 |
| 5-15103 | 2/1993 | Japan | H04N 1/40 |
| 6-291994 | 10/1994 | Japan | H04N 1/40 |
| 6-85185 | 10/1994 | Japan | G06F 15/68 |
| 6-91604 | 11/1994 | Japan | H04N 1/393 |
| 6-91608 | 11/1994 | Japan | H04N 1/40 |

*Primary Examiner*—Leo Boudreau
*Assistant Examiner*—Wenpeng Chen
*Attorney, Agent, or Firm*—Woodcock Washburn Kurtz Mackiewicz & Norris LLP

[57] ABSTRACT

The current invention discloses methods and devices of storing an additional piece of information along with compressed image data without increasing the compressed data size and without substantially affecting the reproduced image. To accomplish the above objectives, an additional piece of the information such as a data block image characteristic signal is inserted in certain compressed data at or near the least significant bit position. Because of the position, the compressed data does not substantially affect the de-compression process. However, the additional information is used to improve the reproduced image.

28 Claims, 6 Drawing Sheets

FIG. 3
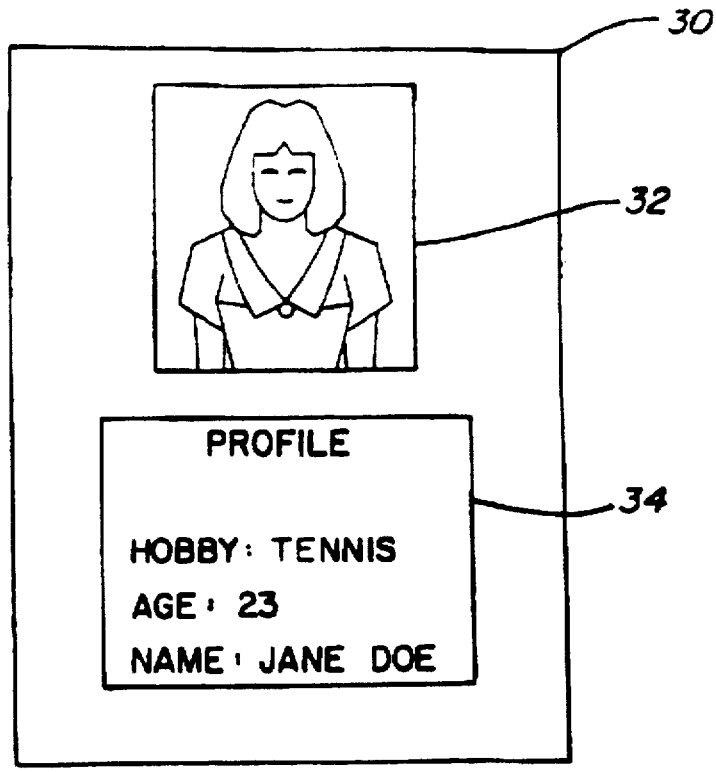
FIG. 4A
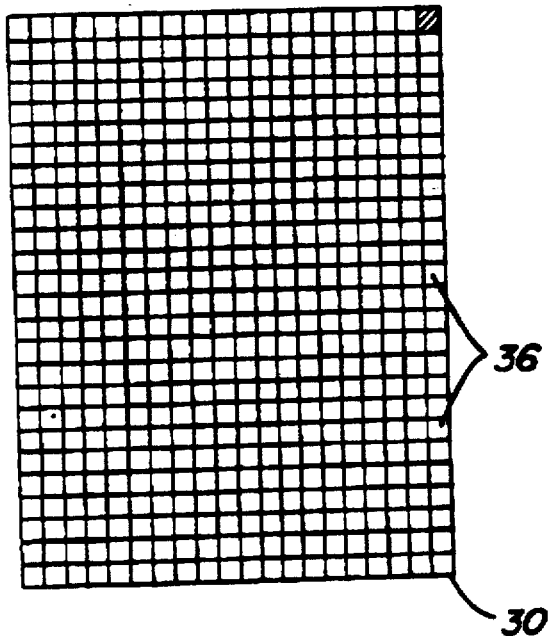
FIG. 4B
| $L_{00}$ | $L_{10}$ | $L_{20}$ | $L_{30}$ |
|---|---|---|---|
| $L_{01}$ | $L_{11}$ | $L_{21}$ | $L_{31}$ |
| $L_{02}$ | $L_{12}$ | $L_{22}$ | $L_{32}$ |
| $L_{03}$ | $L_{13}$ | $L_{23}$ | $L_{33}$ |

FIG. 5
```
La = (Lmax + Lmin)/2
Ld = (Lmax - Lmin)/2
Pi = La + 1/2Ld - (i-1)Ld          (i = 1~2)
Qj = La + 3/4Ld - 1/2(j - 1)Ld     (j = 1~4)
for (j = 0..3){
   for (j = 0..3){
      if (Lij > = P1)         ∅ij = 11
      else if (Lij > = La)    ∅ij = 10
      else if (Lij > = L2)    ∅ij = 00
      else                    ∅ij = 01
```
FIG. 8A
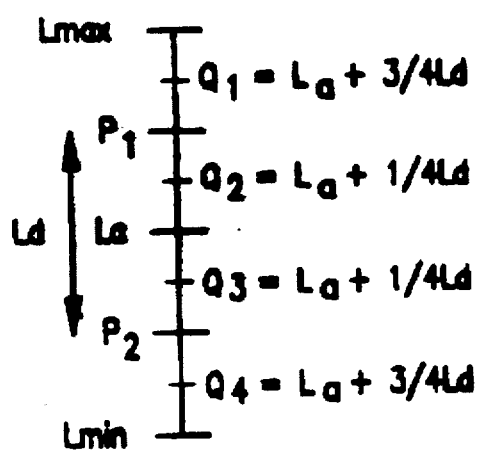
FIG. 8B
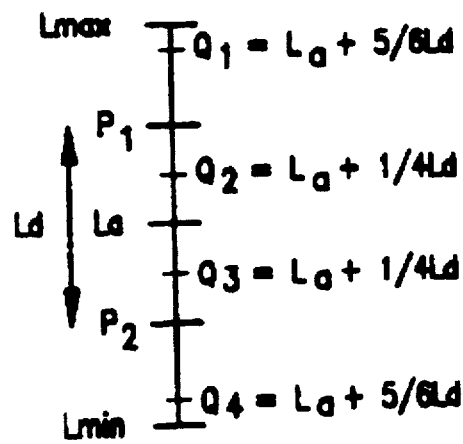

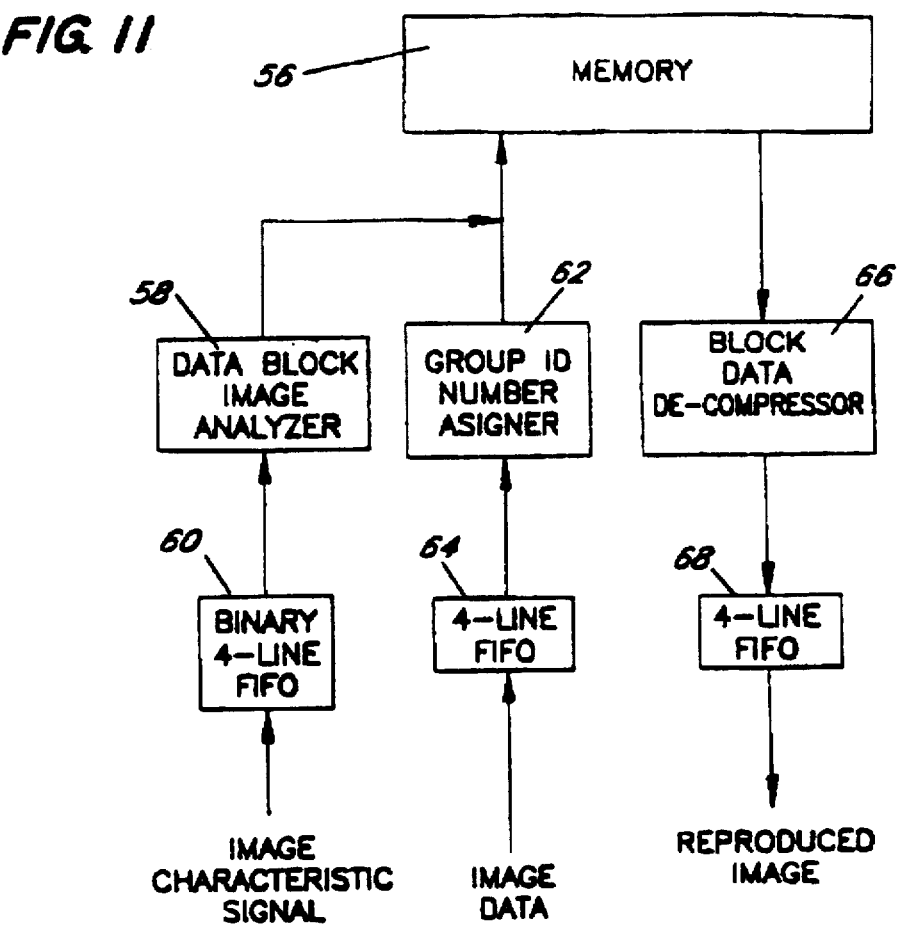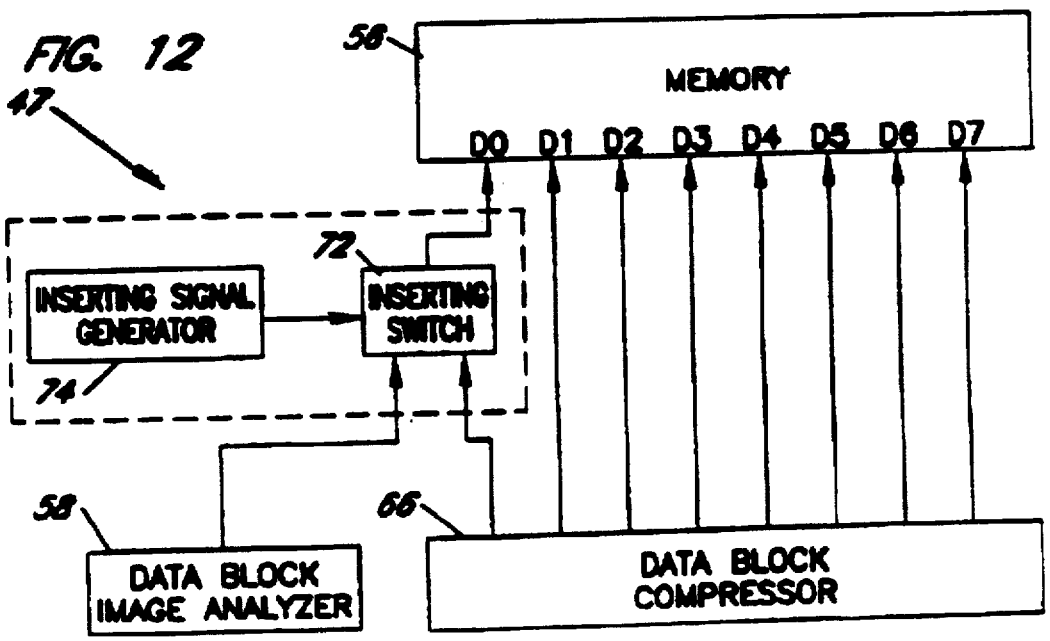

METHOD AND SYSTEM FOR STORING INFORMATION IN COMPRESSED BLOCK DATA

FIELD OF THE INVENTION

The current invention is generally directed to a method and a system of inserting certain information on a compressed data block and particularly related to a method and a system of storing data block characteristic information at or near the least significant bit position of a predetermined data piece without increasing the overall storage space as well as substantially affecting the quality of a de-compressed image in reproduction devices such as scanners and printers.

BACKGROUND OF THE INVENTION

Data compression has been incorporated in image reproduction devices such as scanners, printers and digital copiers. In general, image data is digitized for each pixel which is a unit of image representation for representing a point in the image. For example, each pixel may be represented by 8 bits (one byte) or 256 shades of colors. In this example, although the total number of bytes to represent an image depends upon the resolution and the size of the image, a large memory space is necessary to store the above described digitized image data. To ease the memory requirement, the image data may be compressed for storage without affecting the image quality when it is later de-compressed for its original image.

To compress the above described voluminous image data, one known prior art compression technique divides the data into smaller pieces called data blocks. The following steps are performed for each of these data blocks. Firstly, for each data block, based upon statistical analyses, a predetermined number of numerical ranges of pixel values is determined. Secondly, pixels are grouped into the above described ranges based upon their pixel values and identified by a group ID number. For example, assuming that each pixel is represented by one byte, a 4-byte by 4-byte (16 bytes) data block represents 16 pixels. Further assuming that four ranges are determined for each data block, each range is identified by two bits of the group ID number. In other words, each pixel now has two bits rather than eight bits. Consequently, after the above described compression, the 16-byte data block is now represented by 32 bits (2×16 bits on 4 bytes). However, since two additional bytes of statistical information must be also stored for each data block, the over-all compression rate in the above example is 3/8 (6 bytes/16 bytes).

To reproduce the original image, the above compressed image data is retrieved for each data block, and the reverse process known as de-compression must be performed. Based upon the retrieved group ID's and statistical information, the pixel value is calculated to approximate its original value in 8 bits. This process is repeated for each pixel in the same data block and then for every data block. Although the reconstructed image using the above described data compression and decompression techniques is generally indistinguishable to human eye, certain parts such as edges of an image appear to be irregular and need to be improved.

To improve the edge representation in the reproduced image, some prior art attempts included a technique requiring additional information in the compressed data. For example, if a data block is determined to be a part of a character based upon a known pattern matching technique, an additional piece of data indicative of the character representation is added to the compressed data. This additional information is used when an output device reproduces the original image on an image-carrying medium such as paper or screen. In this regard, some other prior attempts included a method and a system to modify the activation timing with respect to an onset pulse signal in certain output devices such as laser printers. When a data block to be reproduced is indicated as a part of a character, certain pixels near an edge are joined together by placing outer pixels adjacent to inner pixels as the onset of the activation of laser is adjusted based upon the above described additional information. As shown in FIGS. 1B and 1C, when a data block is identified as a character part, the two adjacent pixels 20 are joined together by fusing the onset pulse signals 22 together to activate the laser for 52 nano seconds in stead of two distinct activation pulses of 20 nano seconds and 32 nano seconds. On the other hand, when a data block is identified as a noncharacter part or a picture part, as shown in FIGS. 2B and 2C, the two activation signals 24 and 26 are not joined together, and a distinct pixel pattern 28 is generated.

The above-described data block characteristic information generally improves the output image quality at the cost of additional memory storage. Since the additional information must be stored for every data block, the additional memory space depends upon the number of data blocks times the size of the block characteristic information. This dilemma between improving the reproduced image and maintaining a high compression rate often frustrates one of ordinary skill in the art.

SUMMARY OF THE INVENTION

To solve the above-described and other problems, according to one aspect of the current invention, a method of combining block information with compressed data involves the steps of: a) compressing a data block into a compressed data block based upon a predetermined data compression algorithm, the compression algorithm generating intermediate data; b) generating data block characteristic information of the data block; c) inserting the data block characteristic information into one of the intermediate data at a predetermined position near the least significant bit; and d) storing a certain predetermined portion of the intermediate data after the step c) and the compressed data block whereby the data block characteristic information is stored without increasing memory storage space as well as without substantially affecting the compressed data block.

According to a second aspect of the current invention, a method of combining data block information with compressed data, involves the steps of: a) compressing a data block into a compressed data block based upon a predetermined data compression algorithm, the data block including pixels, the compression algorithm generating intermediate data, the predetermined data compression algorithm tagging each of the pixels with an identifier based upon a comparison to the intermediate data; b) generating a data block characteristic binary signal of the data block based upon a predetermined data block characterization algorithm; c) inserting the data block characteristic binary signal into one of the intermediate data at the least significant bit position; d) storing a certain predetermined portion of the intermediate data after the step c) and the compressed data block; e) reproducing the data block based upon the stored intermediate data and the compressed data block based upon a predetermined data de-compression algorithm; f) extracting the data block characteristic binary signal from the one of the intermediate data; and g) controlling an output device based upon the data block characteristic binary signal.

According to a third aspect of the current invention, a system of combining data block information with compressed data, includes a data block compressor for compressing a data block into a compressed data block based upon a predetermined data compression algorithm, the data compressor generating intermediate data; a data block characteristic analyzer connected to the data block compressor for determining a characteristic of the data block and generating a data block characteristic signal; a data inserter connected to the data block characteristic analyzer for inserting the data block characteristic signal into the intermediate data at a predetermined position near the least significant bit; and an image managing unit for storing the intermediate data and the compressed data block whereby the data block characteristic signal is stored without increasing memory storage space as well as without substantially affecting the compressed data block.

According to a fourth aspect of the current invention, a system of combining data block information with compressed data, includes a data block compressor for compressing a data block into a compressed data block based upon a predetermined data compression algorithm, the data block including pixels, the compression algorithm generating intermediate data, the predetermined data compression algorithm tagging each of the pixels with an identifier based upon a comparison to the intermediate data; a data block analyzer connected to the data block compressor for generating a data block characteristic binary signal of the data block based upon a predetermined data block characterization algorithm; a data inserter connected to the data block analyzer for inserting the data block characteristic binary signal into one of the intermediate data at the least significant bit position; an image managing unit for storing and retrieving a certain predetermined portion of the intermediate data containing the data block characteristic binary signal and the compressed data block; a data block de-compressor connected to the image managing unit for reproducing the data block based upon the stored intermediate data and the compressed data block based upon a predetermined data de-compression algorithm; a data extractor connected to the data block de-compressor for extracting the data block characteristic binary signal from the one of the intermediate data; and an output device controller in response to the data block characteristic binary signal for controlling an output device.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 3 illustrates an original image including both characters and a picture.

FIGS. 4A and 4B illustrate how an original image is divided into data blocks and how each data block represents pixels.

FIG. 5 illustrates a portion of a compression algorithm that is used in one preferred embodiment of the current invention.

FIGS. 8A and 8B illustrate the relationship among intermediate data and ranges according to the current invention.

FIG. 11 is a block diagram for illustrating one preferred embodiment of a block data compression sub-system according to the current invention.

FIG. 12 is a block diagram for illustrating one preferred embodiment of an inserter sub-system according to the current invention.

DETAILED DESCRIPTION OF THE PREFERRED EMBODIMENT(S)

Figure 1:
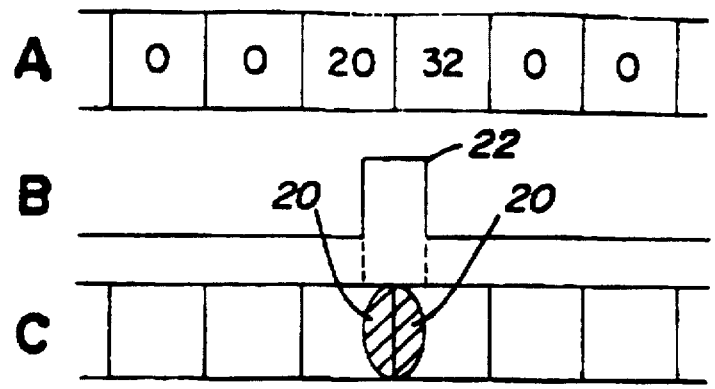
FIGS. 1A, 1B and 1C illustrate timing diagrams for an output device for reproducing an original image which is a part of a character.
Figure 2:
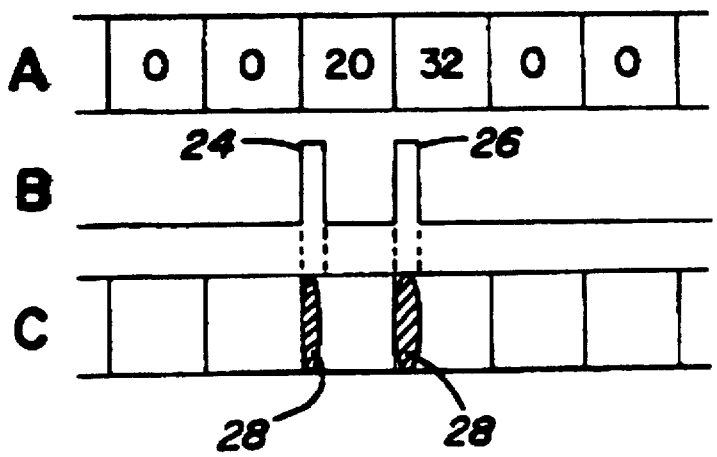
FIG. 2A, 2B and 2C illustrate timing diagrams for an output device for reproducing an original image which is not a part of a character.

Referring now to the drawings, wherein like reference numerals designate corresponding structure throughout the views, and referring in particular to FIG. 3, a digital image 30 may include both a picture 32 and characters 34. While the picture 32 includes any pattern of dots, the characters 34 generally include more predictable patterns of dots. To further describe how the picture 32 is digitally represented, as shown in FIG. 4A, the whole picture 32 is organized by a collection of small squares called data blocks 36. Each data block 36 further includes a predetermined number of pixels. FIG. 4B illustrates a 4-pixel by 4-pixel data block which contains 16 pixels respectively identified as $L_{00}$ through $L_{33}$. Each pixel which generally corresponds to a unit of an output device is represented by a predetermined number of bits such as 8 bits or one byte. Still referring to FIG. 4A, since the data block 36 each contains 16 bytes and the picture contains 520 data blocks, the entire picture contains 8320 bytes of information.

According to one prior art compression/decompression technique in general, a minimal pixel value (Lmin) and a maximal pixel value (Lmax) are determined for each data block so as to calculate a predetermined number of ranges. Based upon these ranges, pixel values are placed into the predetermined number of groups, and each pixel is identified by a unique group ID number. For each pixel, only the unique group ID is stored as compressed data. In addition to a set of the group ID numbers, a pair of intermediate data is also stored. For example, according to one preferred method of the current invention, after Lmax and Lmin are determined for a data block, as shown in FIG. 5, intermediate data, La=(Lmax+Lmin)/2 and Ld=(Lmax−Lmin)/2 are calculated. Based upon La and Ld, $P_1$ and $P_2$ are further calculated as follows:

$P_1 = La + 1/2\ Ld$ $P_2 = La - 1/2\ Ld$

Based upon $P_1$, $P_2$ and La, the predetermined number of ranges is established and each one-byte pixel is assigned a 2-bit group ID. In other words, as shown in the if-else-if-else statement in the for loop in FIG. 5, based upon the original pixel value, each pixel $\phi_{ij}$ is assigned to one of the four ranges set by $P_1$, $P_2$ and La and assigned a corresponding 2-bit group ID number (i.e., 00, 01, 10 or 11). A binary number, "11" is assigned if the pixel value is equal to or larger than the $P_1$; "10" if the pixel value is equal to or larger than La; "00", if the pixel value is equal to or larger than $P_2$; and "01" to all other pixels.

In summary, the above described 2-bit group ID's, La and Ld are stored as compressed data for each data block. For a 16-byte data block as shown in FIG. 4B, the total of 6 bytes which include sixteen 2-bit group ID numbers (32 bits or 4 bytes), La (one byte) and Ld (one byte) are stored as compressed data. However, the current invention is not limited to the above-described compression algorithm. For example, the compression algorithm may be modified to have a different number of ranges.

In addition, according to one preferred method of the current invention, each data block is also analyzed for its image characteristics. For example, image characteristics include whether a data block is a part of a character or not. As described in the Background of the Invention, a prior art compression/decompression technique reproduces an image with deteriorated edges. One way to improve such edge characteristics is to treat edges of a character differently from those of a picture. To determine such an image characteristic of a given data block, a pattern matching may be performed. Although image characteristics also include other qualities such as information on a predetermined color in a two-tone color output, in this particular example, the image characteristic is defined as a binary characteristic which includes either a character image value or a picture image value. According to one preferred embodiment, each pixel value is compared to a predetermined threshold value. "1" is assigned to a pixel when its original pixel value is above the predetermined threshold value while "0" is assigned when the original pixel value is less than the predetermined threshold value.

Figure 6A:
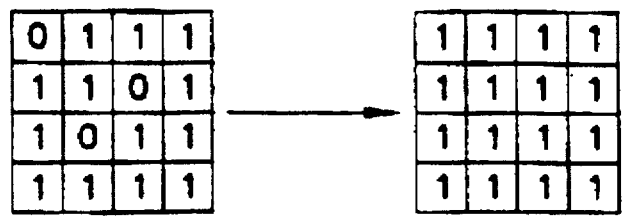
FIGS. 6A, 6B, and 6C illustrate examples how a pattern recognition algorithm determines a given data block to be a part of a character.
Figure 6B:
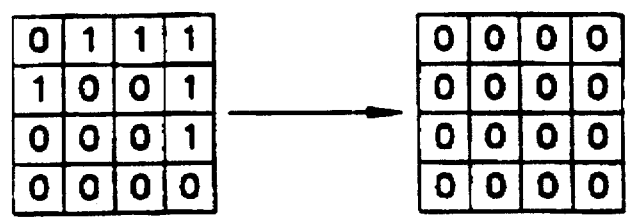
Figure 6C:
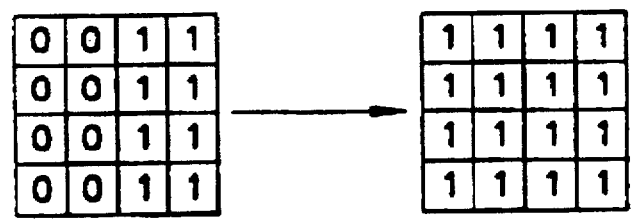

Then, the pattern of "0s" and "1s" in a data block is compared to a predetermined non-character patterns or picture patterns. When the data block patter matches one of the predetermined patterns, the data block is considered as a non-character and "1" is assigned to each pixel as shown in FIGS. 6A and 6C. On the other hand, if a given data block is determined to have a character pattern, every pixel in the data block is considered to be a part of a character as shown in FIG. 6B. Based upon the above described image characteristic analysis, each data block is assigned a data block image characteristic value. To store this additional image characteristic value for each data block, additional memory was required in prior art.

Although the image characteristic information improves the image quality, the effectiveness of the data compression is substantially reduced due to the additionally required memory space. To illustrate the reduced data compressibility, an image size of A4 paper is considered in the following example. The A4 paper contains 3360 pixels× 4752 pixels at the resolution of 16 pixels per millimeter. If a data block is defined to be 4 pixels×4 pixels, the A4-size image contains 840 data blocks×1188 data blocks. To store additional one-bit information for each data block in the above image, additional 124740 bytes are necessary. Since the compressed data is 598752 bytes at the above compression rate of 3/8, this additional amount of information is approximately 2% of the compressed data.

This percentage worsens as the size of the data block becomes smaller and the total number of the data blocks in the same image becomes larger. Consequently, the amount of storage space for the additional information also increases.

The above-described percentage also worsens when as the size of additional information increases. For example, if 2-bit information is stored for each of the above described data block, nearly 4% of the additional storage space is needed.

Figure 7:
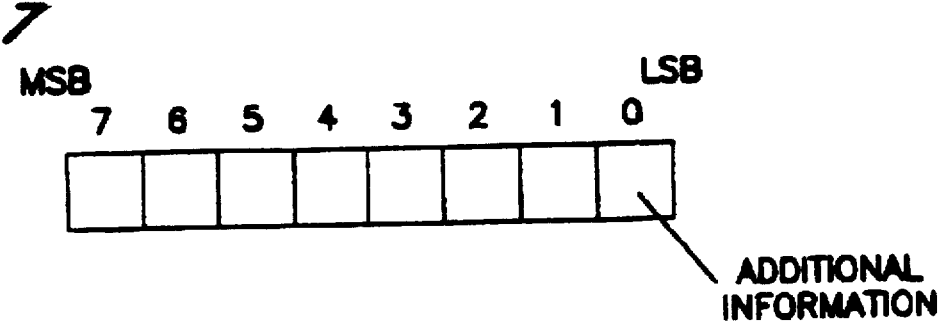
FIG. 7 illustrates one preferred embodiment for storing block data characteristic information at a predetermined position of a certain intermediate data.

To eliminate the need for additional storage and at the same time, to take advantage of the additional information, one preferred method of the current invention stores the additional one-bit information at the least significant position of Ld as shown in FIG. 7. Since Ld is directly used as "1/2Ld" during a decompression process as will be later described and the least significant value zero or one is substantially insignificant, the modification of the least significant bit does not substantially affect the reproduced image. In fact, no perceptible change is seen in the reproduced output image. According to an alternative embodiment of the current invention, the least significant bit of La stores the additional one bit information for each data block. There is not perceptible difference between the reproduced images using La and Ld as a storage area for the above described additional information. In either case, approximately 2% of the storage space for the compressed data is saved for the 1-bit additional information without affecting the reproduced size.

To reproduce an original image, based upon the above described stored information, the following decompression algorithm is used to approximate an original pixel value. In the decompression algorithm, the approximated values $Q_j$ ($j$=1, 2, 3, 4) are first calculated for each data block based upon the stored La and Ld as follows:

$$Q_1 = La + 3/4\ Ld$$

$$Q_2 = La + 1/4\ Ld$$

$$Q_3 = La - 1/4\ Ld$$

$$Q_4 = La - 3/4\ Ld$$

These $Q_1$–$Q_4$ values are assigned to each pixel based upon the corresponding group ID numbers that are stored in the compressed data. That is, according to one embodiment, if the group ID number is the binary number, "11," the $Q_1$ value is assigned to the pixel; if the group ID number is "10," the $Q_2$ value is assigned to the pixel; if the group ID number is "00," the $Q_3$ value is assigned to the pixel; and if the group ID number is "01," the $Q_4$ value is assigned to the pixel. Thus, these approximated values reproduce the original image. During the reproduction process, the above-described additional information is retrieved from either La or Ld so as to enhance the reproduced image. As described above, the additional information such as a binary image characteristic signal is used to enhance edges of characters in the reproduced image by fine tuning an output device. For example, the onset of activation of the output signals for adjacent pixels is adjusted based upon the image characteristic signal. If the image characteristic signal indicates that a current data block is a part of a character image and the adjacent pixels are not contiguous, the activation timing of these output signals is adjusted to join these pixel outputs to sharpen the edge characteristic.

The relationships among La, Ld, $P_i$ and $Q_j$ are illustrated in FIGS. 8A and 8B. In general, La indicates an average value of the pixel value within the data block. La along with $P_1$ and $P_2$ establish the ranges for the pixel values. In these examples shown in FIGS. 8A and 8B, although four ranges are established between the maximal value (Lmax) and the minimal value (Lmin), the number of ranges may be different. During the reproduction process, the above described decompression algorithm calculates the approximated values $Q_1$–$Q_4$ which respectively fall within the above described ranges. However, as shown in FIG. 8B, $Q_1$, and $Q_4$ are not necessarily the middle value of respective ranges.

Figure 9:
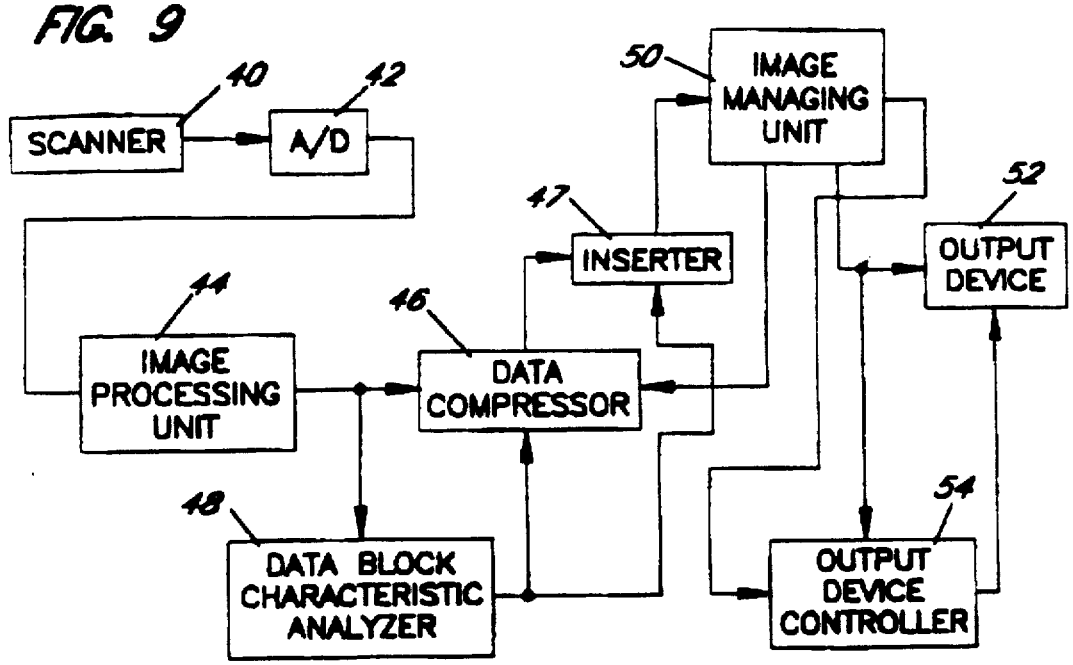
FIG. 9 is a block diagram for one preferred embodiment of a system according to the current invention.

Referring to FIG. 9, one preferred embodiment of a system according to the current invention is illustrated.

When an image is digitized by a scanner 40 and an analog to digital (A/D) converter 42, the digitized data is formatted by the image processing unit 44 in preparation for an image characteristic analysis by a data block characteristic analyzer 48 and for data compression by a data compressor 46. The image processing unit 44 generates certain predetermined intermediate data for each data block. These intermediate data include Lmax, Lmin, Ld, La, $P_1$ and $P_2$ as defined above. The data block characteristic analyzer 48 determines whether a given data block has a certain characteristic. For example, the analyzer 48 determines whether a data block is a part of a character under certain settings while it determines whether a data block is a part of a picture under certain other settings. As described with respect to FIGS. 6A, 6B and 6C, the data block characteristic analyzer 48 generates a data block characteristic signal indicative of the above described determination. The data compressor, on the other hand, determines a predetermined number of ranges based upon intermediate data and assigns each pixel a group ID number corresponding to a particular range. This assignment compresses the original pixel value to a group ID number representative of an approximated compressed value. An inserter 47 is connected to the data compressor 46 as well as to the data block characteristic analyzer 48 for inserting the data block characteristic signal into a certain intermediate data at the least significant bit position. The intermediate data such as La and Ld is stored along with the compressed data in an image managing unit 50 for later reproduction.

To output an image via an output device 52, the image managing unit 50 retrieves the stored data and reproduces an approximate image based upon the stored compressed data. The image managing unit 50 further comprises a sub-system for de-compress the stored compressed data. The decompression sub-system will be described below.

To control the output device 52 based upon a stored image characteristic signal, the image managing unit 50 sends a data block characteristic signal to an output device controller 54.

Figure 10:
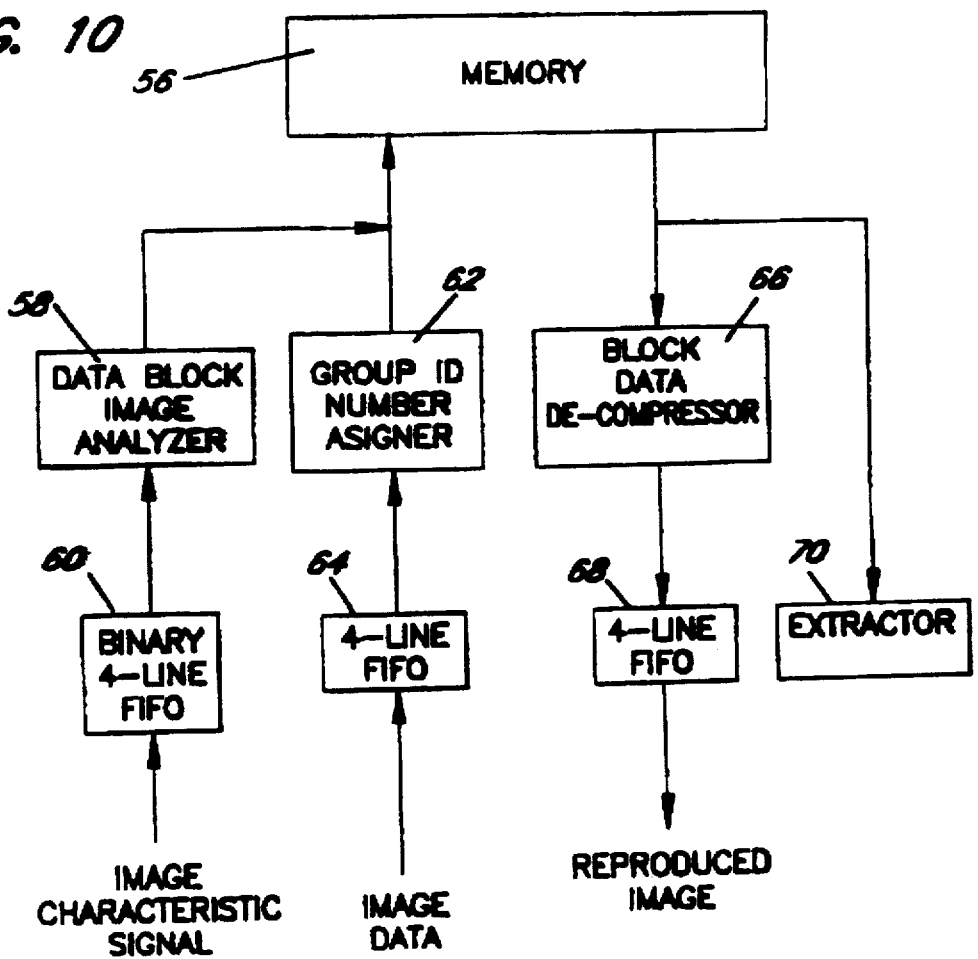
FIG. 10 is a block diagram for one preferred embodiment of an input/output sub-system according to the current invention.

Referring to FIGS. 10 and 11, some components related to compression as shown in FIG. 9 are further described according to preferred embodiments of the current invention. The data compressor 46 further comprises a 4-line First-In-First-Out (FIFO) 64 for separating a block data and a group ID number assigner 62 for assigning a group ID number to each pixel in the data block. The 4-line FIFO 60 provides latches with 16 bytes of a data block at a time.

As described previously, for each data block, the group ID number assigner establishes a predetermined number of ranges based upon intermediate data such as Lmax and Lmin and assigns each pixel a group ID number corresponding to a particular range that the pixel value belongs. The data block characteristic analyzer 48 further comprises a binary 4-line FIFO 60 for processing a set of binary signals and a data block image analyzer 58 for generating a block characteristic signal. Both the group ID numbering unit 62 and the data block image analyzer 58 are connected to a memory 56 so as to store their outputs which include La and Ld for the data block and the group ID numbers for the pixels in the data block.

Still referring to FIGS. 10 and 11, some components related to decompression as shown in FIG. 9 are further described according to preferred embodiments of the current invention. The image managing unit 50 further comprises the memory 56, a data block de-compressor 66 for approximating an original pixel value based upon the stored group ID number, a 4-line FIFO 68 for processing the approximated value to generate a reproduced image and a binary 4-line FIFO or an extractor 70 for extracting the block data characteristic signal according to one preferred embodiment as shown in FIG. 10. A second preferred embodiment as shown in FIG. 11, the image managing unit 50 does not include the extractor 70. In general, in order to reproduce an image, the image managing unit retrieves the stored compressed data from the memory 56, and the data block de-compressor 66 approximates original pixel values based upon the stored group ID numbers and the calculated Q values. The 4-line FIFO generates a predetermined number of pixel values to generate a reproduced image. In one preferred embodiment as shown in FIG. 10, the retrieved data block is fed into the extractor 70, and the extractor 70 isolates the data block characteristic signal.

Referring to FIG. 12, the inserter 47 further comprises an inserting signal generator 74 and an inserting switch 72. According to one preferred embodiment of the current invention, 8 bits of data are stored at a time from the data block compressor 66 to the memory 56 as indicated by arrows D0–D7. As described above, the data to be stored include 8-bit La, 8-bit Ld and 32-bit group ID numbers. While the 8-bit data can be stored at once, the 32-bit data is stored over four repeated operations. As the compressed data in the data block compressor 66 is stored in the memory 56, the inserting signal generator 74 sends a signal to the inserting switch 72. When Ld is to be stored, the signal indicates the inserting switch 72 to store a data block characteristic signal from the data block image analyzer 58 at the least significant bit D0 in the memory 56. When data other than Ld is stored, the D0 position stores the corresponding bit in the data block compressor 66.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method of combining block information with compressed data, comprising the steps of:
   a) compressing a data block into a compressed data block based upon a predetermined data compression algorithm, said compression algorithm generating intermediate data;
   b) generating data block characteristic information of said data block;
   c) inserting said data block characteristic information into one of said intermediate data at a predetermined position near the least significant bit; and
   d) storing a certain predetermined portion of said intermediate data after said step c) and said compressed data block whereby said data block characteristic information is stored without increasing memory storage space as well as without substantially affecting said compressed data block.

2. The method of combining data block information according to claim 1 wherein said data block represents a predetermined number of pixels, each of said pixels having a value and being represented by a predetermined number of bits.

3. The method of combining data block information according to claim 2 wherein said predetermined data compression algorithm groups said pixels into a predetermined number of groups based upon said intermediate data.

4. The method of combining data block information according to claim 3 wherein said intermediate data include a first average of a maximal value and a minimal value of said pixels in said data block, said first average defining La, a second average of a difference between the maximal value and the minimal value of said pixels in said data block, said second average defining Ld.

5. The method of combining data block information according to claim 4 wherein said intermediate data further include $P_1$, $P_2$, $Q_1$, $Q_2$, $Q_3$, $Q_4$ as defined by the following equations:

$P_1 = La + 1/2 \, Ld$, $P_2 = La - 1/2 \, Ld$, $Q_1 = La + 3/4 \, Ld$, $Q_2 = La + 1/4 \, Ld$, $Q_3 = La - 1/4 \, Ld$, and $Q_4 = La - 3/4 \, Ld$.

6. The method of combining data block information according to claim 5 wherein said predetermined data compression algorithm groups said pixels into four groups based upon said intermediate data, a first group including some of said pixels having a value of equal to or larger than said $P_1$, a second group including some of said pixels having a value equal or larger than La, a third group including some of said pixels having a value equal or larger than $P_2$, and a fourth group including the rest of said pixels.

7. The method of combining data block information according to claim 6 wherein said data block is a 4-byte by 4-byte block containing 16 pixels, each pixel being represented by a byte of data, each of said four groups being identified by two bits thereby compressing each pixel to said two bits so as to generate said compressed data block of 4 bytes, said La and said Ld being each 1 byte, a total of 6 bytes including said compressed data block, said La and said Ld being stored for said data block.

8. The method of combining data block information according to claim 1 wherein said data block characteristic information includes data indicating whether said data block represents a portion of a character.

9. The method of combining data block information according to claim 1 wherein said data block characteristic information includes data indicating whether said data block represents a portion of a picture.

10. The method of combining data block information according to claim 1 wherein said position is the least significant bit in one of said intermediate data.

11. The method of combining data block information according to claim 1 further comprises the following steps for decompression:

e) reproducing said data block based upon said stored intermediate data and said compressed data block based upon a predetermined data de-compression algorithm;

f) extracting said data block characteristic information; and g) controlling an output device based upon said data block characteristic information.

12. A method of combining data block information with compressed data without additional memory space, comprising the steps of:

a) compressing a data block into a compressed data block based upon a predetermined data compression algorithm, said data block including pixels, said compression algorithm generating intermediate data, said predetermined data compression algorithm tagging each of said pixels with an identifier based upon a comparison to said intermediate data;

b) generating a data block characteristic binary signal of said data block based upon a predetermined data block characterization algorithm;

c) inserting said data block characteristic binary signal into one of said intermediate data at the least significant bit position;

d) storing a certain predetermined portion of said intermediate data after said step c) and said compressed data block;

e) reproducing said data block based upon said stored intermediate data and said compressed data block based upon a predetermined data de-compression algorithm;

f) extracting said data block characteristic binary signal from said one of said intermediate data; and g) controlling an output device based upon said data block characteristic binary signal.

13. A method of combining data block information according to claim 12 wherein said data block characteristic binary signal indicates that said data block represents a part of a character.

14. A method of combining data block information according to claim 13 wherein based upon said block characteristic binary signal, said step g) activating said output device to join adjacent pixels representing parts of said character.

15. A system of combining data block information with compressed data without additional memory space, comprising:

a data block compressor for compressing a data block into a compressed data block based upon a predetermined data compression algorithm, said data compressor generating intermediate data;

a data block characteristic analyzer connected to said data block compressor for determining a characteristic of said data block and generating a data block characteristic signal;

a data inserter connected to said data block characteristic analyzer for inserting said data block characteristic signal into said intermediate data at a predetermined position near the least significant bit; and an image managing unit for storing said intermediate data and said compressed data block whereby said data block characteristic signal is stored without increasing memory storage space as well as without substantially affecting said compressed data block.

16. The system of combining data block information according to claim 15 wherein said data block represents a predetermined number of pixels, each of said pixels having a value and being represented by a predetermined number of bits.

17. The system of combining data block information according to claim 16 wherein said data block compressor groups said pixels into a predetermined number of groups based upon said intermediate data.

18. The system of combining data block information according to claim 17 wherein said intermediate data include a first average of a maximal value and a minimal value of said pixels in said data block, said first average defining La, a second average of a difference between the maximal value and the minimal value of said pixels in said data block, said second average defining Ld.

19. The system of combining data block information according to claim 18 wherein said intermediate data further include $P_1$, $P_2$, $Q_1$, $Q_2$, $Q_3$, $Q_4$ as defined by the following equations:

$P_1 = La + 1/2\ Ld$, $P_2 = La - 1/2\ Ld$, $Q_1 = La + 3/4\ Ld$, $Q_2 = La + 1/4\ Ld$, $Q_3 = La - 1/4\ Ld$, and $Q_4 = La - 3/4\ Ld$.

20. The system of combining data block information according to claim 19 wherein said data block compressor groups said pixels into four groups based upon said intermediate data, a first group including some of said pixels having a value of equal to or larger than said $P_1$, a second group including some of said pixels having a value equal or larger than La, a third group including some of said pixels having a value equal or larger than $P_2$, and a fourth group including the rest of said pixels.

21. The system of combining data block information according to claim 20 wherein said data block is a 4-byte by 4-byte data block containing 16 pixels, each pixel being represented by a byte of data, each of said four groups being identified by two bits thereby compressing each pixel to said two bits so as to generate said compressed data block of 4 bytes, said La and said Ld being each 1 byte, a total of 6 bytes including said compressed data block, said La and said Ld being stored for said data block.

22. The system of combining data block information according to claim 15 wherein said data block characteristic signal indicates whether said data block represents a portion of a character.

23. The system of combining data block information according to claim 15 wherein said data block characteristic signal indicate whether said data block represents a portion of a picture.

24. The system of combining data block information according to claim 15 wherein said predetermined position is the least significant bit in said intermediate data.

25. The system of combining data block information according to claim 15 further comprises:

a data block de-compressor connected to said image managing unit for reproducing said data block based upon said stored intermediate results and said compressed data block based upon a predetermined data de-compression algorithm;

an extractor connected to said data block decompressor for extracting said data block characteristic signal; and a controller connected to said extractor for controlling an output device based upon said data block characteristic signal.

26. A system of combining data block information with compressed data without additional memory space, comprising:

a data block compressor for compressing a data block into a compressed data block based upon a predetermined data compression algorithm, said data block including pixels, said compression algorithm generating intermediate data, said predetermined data compression algorithm tagging each of said pixels with an identifier based upon a comparison to said intermediate data;

a data block analyzer connected to said data block compressor for generating a data block characteristic binary signal of said data block based upon a predetermined data block characterization algorithm;

a data inserter connected to said data block analyzer for inserting said data block characteristic binary signal into one of said intermediate data at the least significant bit position;

an image managing unit for storing and retrieving a certain predetermined portion of said intermediate data containing said data block characteristic binary signal and said compressed data block;

a data block de-compressor connected to said image managing unit for reproducing said data block based upon said stored intermediate data and said compressed data block based upon a predetermined data de-compression algorithm;

a data extractor connected to said data block de-compressor for extracting said data block characteristic binary signal from said one of said intermediate data; and an output device controller in response to said data block characteristic binary signal for controlling an output device.

27. A system of combining data block information according to claim 26 wherein said data block characteristic binary signal indicates that said data block represents a part of a character.

28. A system of combining data block information according to claim 26 wherein based upon said data block characteristic binary signal, said output device controller activating said output device to join adjacent pixels representing parts of said character.

* * * * *